US012536616B2

(12) United States Patent
Sartor et al.

(10) Patent No.: US 12,536,616 B2
(45) Date of Patent: Jan. 27, 2026

(54) IMAGE PROCESSING DEVICE AND IMAGE PROCESSING METHOD

(71) Applicant: Sony Group Corporation, Tokyo (JP)

(72) Inventors: Piergiorgio Sartor, Stuttgart (DE); Alexander Gatto, Stuttgart (DE); Takeshi Uemori, Stuttgart (DE); Zoltan Facius, Stuttgart (DE); Vincent Parret, Stuttgart (DE); Ralf Müller, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 686 days.

(21) Appl. No.: 17/768,853

(22) PCT Filed: Oct. 15, 2020

(86) PCT No.: PCT/EP2020/079090
§ 371 (c)(1),
(2) Date: Apr. 14, 2022

(87) PCT Pub. No.: WO2021/078629
PCT Pub. Date: Apr. 29, 2021

(65) Prior Publication Data
US 2024/0303773 A1    Sep. 12, 2024

(30) Foreign Application Priority Data

Oct. 23, 2019    (EP) .................................... 19204783

(51) Int. Cl.
*G06T 5/50*    (2006.01)
(52) U.S. Cl.
CPC ...... *G06T 5/50* (2013.01); *G06T 2207/10036* (2013.01); *G06T 2207/20084* (2013.01)

(58) Field of Classification Search
CPC ............. G06T 5/50; G06T 2207/10036; G06T 2207/20084; G06T 5/60;
(Continued)

(56) References Cited

U.S. PATENT DOCUMENTS 11,354,804 B1 *   6/2022   Behrooz .................. G06T 5/73
2019/0096049 A1   3/2019   Kim et al.
(Continued)

FOREIGN PATENT DOCUMENTS

CN    106485688 A    3/2017
CN    108830796 A    11/2018

OTHER PUBLICATIONS

Yang et al., "Hyperspectral and Multispectral Image Fusion via Deep Two-Branches Convolutional Neural Network," May 21, 2018 (Year: 2018).*

(Continued)

*Primary Examiner* — Phuoc Tran
(74) *Attorney, Agent, or Firm* — XSENSUS LLP

(57) ABSTRACT

An image processing device has circuitry, which is configured to obtain input image data being represented by a number of color channels and to input the input image data into a neural network for generating output multispectral image data, wherein the neural network is configured to generate at least first and second multispectral image data on the basis of the input image data, wherein a number of spectral channels of the second multispectral image data is larger than the number of spectral channels of the first multispectral image data.

20 Claims, 5 Drawing Sheets

(58) Field of Classification Search
CPC . G06T 2207/10024; G06T 2207/20081; G06T 7/90; G06N 3/045; G06N 3/08
See application file for complete search history.

(56) References Cited

U.S. PATENT DOCUMENTS

| | | | |
|---|---|---|---|
| 2020/0302249 A1* | 9/2020 | Liu | G06N 3/08 |
| 2021/0250526 A1* | 8/2021 | Germain | G01J 3/28 |
| 2021/0350590 A1* | 11/2021 | Kim | G06T 5/60 |

OTHER PUBLICATIONS

International Search Report and Written Opinion mailed on Dec. 14, 2020, received for PCT Application PCT/EP2020/079090, Filed on Oct. 15, 2020, 10 pages.
Han et al: "Reconstruction From Multispectral to Hyperspectral Image Using Spectral Library-Based Dictionary Learning", IEEE Transactions on Geoscience and Remote Sensing, vol. 57, No. 3, Mar. 2019, pp. 1325-1335.
Miao et al: "lambda-Net: Reconstruct Hyperspectral Images From a Snapshot Measurement", 2019 IEEE/CVF International Conference on Computer Vision (ICCV), IEEE, Oct. 27, 2019, pp. 4058-4068.
Can et al., "An Efficient CNN for Spectral Reconstruction from RGB Images", arxiv.org, Cornell University Library, Apr. 12, 2018, 5 pages.
Galliani et al., "Learned Spectral Super-Resolution", arXiv:1703.09470v1, Mar. 28, 2017, 10 pages.
Mei et al., "Hyperspectral Image Spatial Super-Resolution via 3D Full Convolutional Neural Network", Remote Sensing, vol. 9, Available Online at: https://www.researchgate.net/publication/320913192_Hyperspectral_Image_Spatial_Super-Resolution_via_3D_Full_Convolutional_Neural_Network Nov. 7, 2017, pp. 1-22.
Li et al., "Hyperspectral image super-resolution using deep convolutional neural network", Journal of Latex Templates, Neurocomputing, Available Online at: https://www.researchgate.net/publication/317024713_Hyperspectral_image_super-resolution_using_deep_convolutional_neural_network May 3, 2017, pp. 1-35.

* cited by examiner

IMAGE PROCESSING DEVICE AND IMAGE PROCESSING METHOD

CROSS-REFERENCE TO RELATED APPLICATIONS

The present application is based on PCT filing PCT/EP2020/079090, filed Oct. 15, 2020, which claims priority to EP 19204783.5, filed Oct. 23, 2019, the entire contents of each are incorporated herein by reference.

TECHNICAL FIELD

The present disclosure generally pertains to an image processing device and an image processing method.

TECHNICAL BACKGROUND

Generally, neural networks, such as Deep Neural Network (DNN) and Convolutional Neural Network (CNN) are known, and they are used in a plurality of technical fields, for example in image processing. Known image processing devices may use DNN and CNN for image reconstruction, multispatial and multispectral image generation, object recognition and the like.

Moreover, DNN and CNN typically have an input layer, an output layer and multiple hidden layers between the input layer and the output layer. In image processing, a neural network may be trained to output images having high spectral resolution or high spatial resolution, using as an input to the neural network, a color channel image, such as an RGB image (having red, green and blue color channels).

Although there exist techniques for image processing, it is generally desirable to improve image processing devices and methods.

SUMMARY

According to a first aspect, the disclosure provides an image processing device comprising circuitry configured to obtain input image data being represented by a number of color channels and to input the input image data into a neural network for generating output multispectral image data, wherein the neural network is configured to generate at least first and second multispectral image data on the basis of the input image data, wherein a number of spectral channels of the second multispectral image data is larger than the number of spectral channels of the first multispectral image data.

According to a second aspect, the disclosure provides an image processing method comprising obtaining input image data being represented by a number of color channels and inputting the input image data into a neural network for generating output multispectral image data, wherein the neural network is configured to generate at least first and second multispectral image data on the basis of the input image data, wherein a number of spectral channels of the second multispectral image data is larger than the number of spectral channels of the first multispectral image data.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 4:
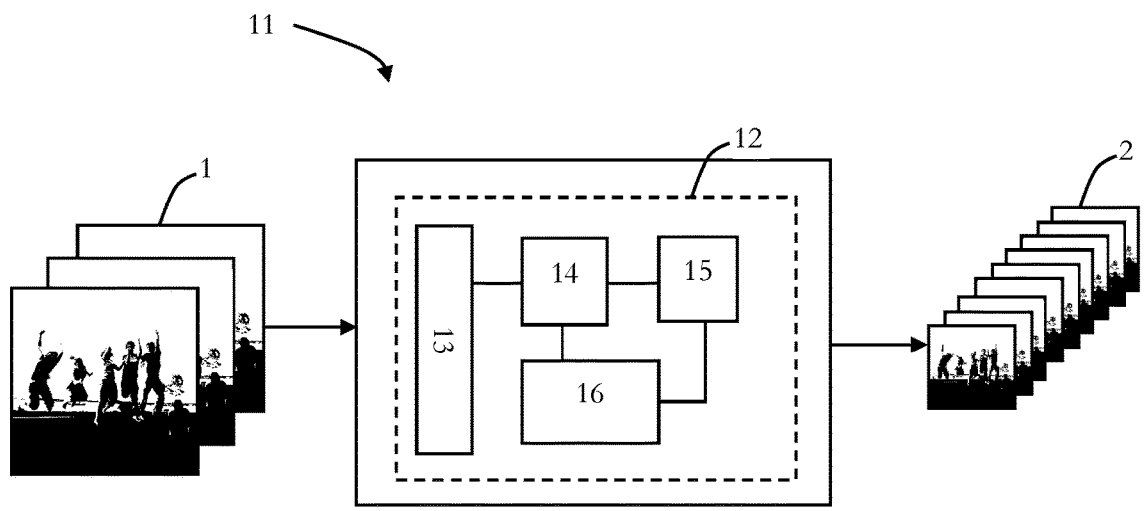
FIG. 4 shows a block diagram of an embodiment of an image processing device

Before a detailed description of the embodiments under reference of FIG. 4 is given, general explanations are made.

As indicated in the outset, it is generally known that multispectral imaging systems and common Red Green Blue (RGB) imaging systems are used to capture and analyze images having high spectral resolution and high spatial resolution, respectively. Typically, a multispectral imaging device provides higher resolved spectral information than a common RGB imaging system. The analysis of a high resolved spectrum may be used in a variety of applications, such as biometrics, remote sensing, medical and food inspection. A multispectral sensing device is usually more expensive than a RGB imaging device.

Moreover, the spatial resolution of a mosaic-array multispectral sensor typically is lower than the spatial resolution of a common RGB sensor. However, since the design costs of a common RGB sensor, usually, are less than the costs of a multispectral sensor, most imaging systems focus on spatial resolution rather than spectral resolution.

It is known that multispectral imaging systems perform hyper/multispectral image data reconstruction from a RGB image using deep learning techniques, in order to benefit from both spatial and spectral resolution information.

As mentioned in the outset, neural networks, such as Deep Neural Network (DNN) and Convolutional Neural Network (CNN) are known, and they have reached state-of-the-art level performance in many domains, such as of image processing, image reconstruction, multispatial and multispectral image generation, language processing and the like. CNN is a part of DNN that are usually applied to analyzing visual imagery.

In particular, CNN uses image classification algorithms for image transformation, multispatial and multispectral image generation, image classification, medical image analysis, image and video recognition, natural language processing, material classification applications (e.g. remote sensing, medical diagnosis) and the like.

As it is generally known, a CNN may have an input layer and an output layer, as well as multiple hidden layers. The hidden layers of a CNN typically have a number of convolutional layers i.e. pooling layers, fully connected layers and the like. Each convolutional layer within a neural network usually has attributes, such as an input having shape (number of images)×(image width)×(image height)×(image depth), a number of convolutional kernels, acting like a filter, whose width and height are hyper-parameters, and whose depth must be typically equal to that of the image. The convolutional layers convolve the input and pass their result to the next layer.

In some cases, it may be suitable, that the Conventional CNN is trained such as to reconstruct a hyper/multispectral image from an RGB image. In such cases, the conventional CNN may be trained to output only images with a predefined number of spectral channels, without taking into account the amount of spectral information, which may be needed for different applications, target scenes, systems, users desires or the like. Moreover, such an approach usually requires a high computational effort as well as much memory when calculating a high resolved multispectral image, which has a large number of spectral channels. Furthermore, the conventional approach typically outputs a hyper/multispectral image with a predefined number of spectral channels, and, thus, maybe with an unnecessary amount of spectral information for a target or vice versa.

However, it has been recognized that, for example, for different systems, applications, target scenes, it is desired to have different spatial resolutions and different spectral resolutions in the output image data. Moreover, a different proportion of spatial resolution and spectral resolution in the output image data may be suitable for different systems, applications, or target scenes. In such cases, it has been recognized a Conventional CNN may not be suitable, since by setting in advance a predetermined number of spectral channels, the output image data may include unnecessary amount of spectral information or spatial information.

Consequently, some embodiments pertain to an image processing device including circuitry configured to obtain input image data being represented by a number of color channels, and to input the input image data into a neural network for generating output multispectral image data, wherein the neural network is configured to generate at least first and second multispectral image data on the basis of the input image data, wherein a number of spectral channels of the second multispectral image data is larger than the number of spectral channels of the first multispectral image data.

The image processing device may be a digital (video) camera, a surveillance camera, a biometric device, a security camera, a medical/healthcare device, a remote sensing device, a food inspection device, an edge computing enabled image sensor, such as smart sensor associated with smart speaker, or the like, a motor vehicles device, a smartphone, a personal computer, a laptop computer, a personal computer, a wearable electronic device, electronic glasses, or the like, a circuitry, a processor, multiple processors, logic circuits or a mixture of those parts.

The circuitry may include one or more processors, logical circuits, memory (read only memory, random memory, etc., storage memory, i.e. hard disc, compact disc, flash drive, etc.), an interface for communication via a network, such as a wireless network, internet, local area network, or the like, a CMOS (Complementary Metal Oxide Semiconductor) image sensor, a CCD (Charge Coupled Device) image sensor, or the like.

The input image data may be generated by the image sensor, as mentioned above. The input image data may be also obtained from a memory included in the device, from an external memory, etc., from an artificial image generator, created via computer generated graphics, or the like.

The input image data may be represented by a number of color channels, for example three color channels, such as Red, Green and Blue, or the like. The input image data may also be represented for example by a small number of spectral channels. The color channel of a specific color, for example red, green, or blue, may include information of multiple spectral channels that corresponds to the wavelength range of red, green, or blue, respectively. That is, the color channels may be considered as an integration of the corresponding (multiple) spectral channels located in the wavelength range of the associated color channel.

Figure 1:
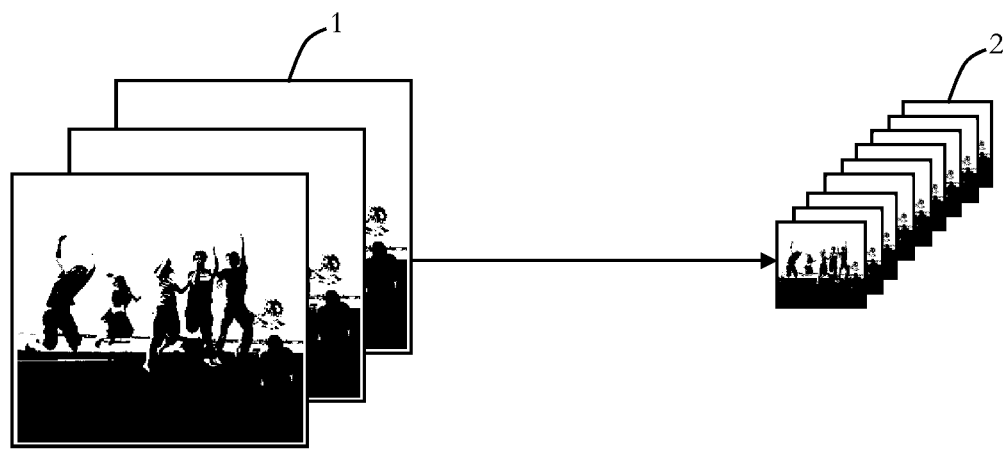
FIG. 1 illustrates a proposed approach of multispectral image data generation from input image data represented by a number of color channels.

Referring to FIG. 1, a proposed approach for generating multispectral image data from input image data represented by a number of color channels is illustrated.

As mentioned above, an image processing device acquires input image data, as input image data 1, representing an image, for example captured by a digital camera. The input image data 1 are represented by a number of color channels. In this embodiment, the number of channels of the input image data 1 is three, namely Red, Green and Blue, without limiting the present disclosure to these three color channels (in principal, any number and type of color channels can be chosen). The input image data 1 are input to a neural network, such as for example a CNN, for generating output multispectral image data, such as multispectral image data 2. The output multispectral image data 2 are generated from the input image data 1 and the number of spectral channels of the output multispectral image data 2 is nine (9), in this embodiment. Therefore, the input image data being represented by a number of color channels have been transformed to output multispectral image data 2 being represented by a number of spectral channels.

The neural network generates at least first and second multispectral image data on the basis of the input image data, wherein a number of spectral channels of the second multispectral image data is larger than the number of spectral channels of the first multispectral image data. The neural network may also generate a plurality of multispectral image data on the basis of the input image data. That is, each of the plurality of multispectral image data may be followed by another multispectral image data and each of the plurality of multispectral image data may be generated on the basis of the previous generated multispectral image data. Hence, multiple intermediate multispectral image data May be generated by the neural network.

In some embodiments, the circuitry may be further configured to obtain the first or the second multispectral image data as the output multispectral image data. As mentioned above, the neural network may generate at least first and second multispectral image data and thus, the circuitry may be obtain, as the output multispectral image data, the first multispectral image data or the second multispectral image data, based, for example, on a setting of a user, or a predetermined set up of the image processing device based on a target application.

In some embodiments, the input image data may include spectral image data. For example, the spectral image data may be input image data represented by a small number of spectral channels, which may be suitable for example, for object classification or the like, using neural network. The input image data may also include Red Green Blue (RGB) image data represented by a specific number of color channels, in which multiple spectral channels are integrated, as described above.

In some embodiments, the number of spectral channels of the output multispectral image data is larger than the number of spectral channels of the input image data. In a case that multispectral image data, represented by a small number of spectral channels, for example, six (6) spectral channels, are input to the processing device, then the number of spectral channels of the output multispectral image data may be nine (9), or the like. Therefore, the output multispectral image data may have, after processing, higher spectral resolution.

Typically, it is desired that a size of the image data remains the same before and after image processing, even in the case of higher spectral resolution of the output image data after image processing. Hence, in some embodiments, a spatial resolution of the first multispectral image data may be higher than a spatial resolution of the second multispectral image data.

As mentioned above, a conventional imaging device, such as a mosaic-array multispectral imaging device, using a conventional neural network, usually sacrifices its spatial resolution for spectral resolution, while both information offers benefits for computational sensing applications. Therefore, it may be suitable, a multispectral image to be generated from a RGB image, or from a multispectral image represented by small number of spectral channels, which has an optimized trade-off condition between spatial and spectral resolution, for the device.

Thus, in some embodiments, the output multispectral image data is generated based on a predetermined relationship between the spatial resolution and the number of spectral channels. The predetermined relationship may be an optimized trade-off relationship between spectral resolution and spatial resolution. The optimal point of an optimized trade-off relationship between spectral resolution and spatial resolution may depend on a system, an application, a target scene, or the like. The predetermined relationship between the spatial resolution and the number of spectral channels may be determined based on a setting of a user, or a predetermined set up of the image processing device according to a target application.

Figure 2:
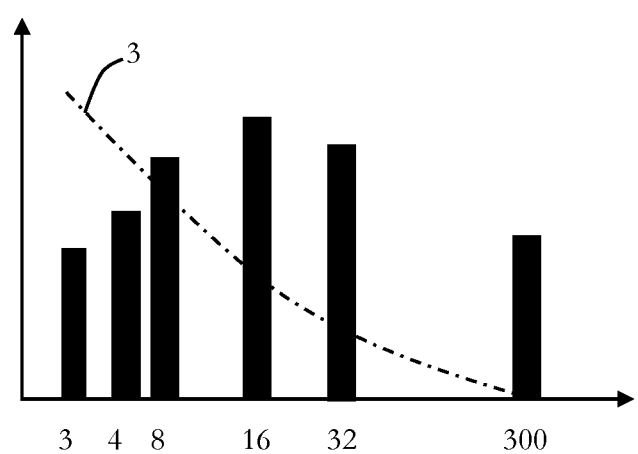
FIG. 2 illustrates an exemplary optimized relationship between spectral resolution and spatial resolution of multispectral image data.

An exemplary optimized relationship between spectral resolution and spatial resolution of multispectral image data, such as multispectral skin data is illustrated in FIG. 2. In particular, in x-axis the number of spectral channels, e.g. spectral bands, is represented in vertical bars. In this embodiment, the number of spectral bands increases from three (3) spectral bands to three hundred (300) spectral bands. The classification accuracy is represented in y-axis, which, in this embodiment, increases with the number of spectral bands, up to the sixteen (16) bands. Dashed line 3 represents the spatial resolution of the image. In this case, the optimized performance is obtained with 16 spectral channels multispectral data. As discussed above, the best relationship between spectral resolution and spatial resolution depends on the target. For example, for other applications, the best trade-off point may be different. Moreover, the optimal relationship between spectral resolution and spatial resolution may change depending on the content in a scene, which may make difficult the design of an optimal multispectral sensor with the best performance.

In some embodiments, the neural network may be a convolutional neural network (CNN), without limiting the present disclosure in that regard. For example, in some embodiments, the convolutional neural network may include convolutional layers, or may also include local or global pooling layers, such as max-pooling layers, which reduce the dimensions of the image data, as it is generally known.

The pooling layers may be used for pooling, which is a form of non-linear down-sampling, such as spatial pooling, namely max-pooling, average pooling, sum pooling, or the like.

The generation of the multispectral image data may be either during a training phase of a neural network, such as a CNN, or may be a generation of the multispectral image data with an already trained neural network, such as a trained CNN, for example, for extracting information from the image data (e.g. object recognition, or recognition of other information in the image data, such as spatial information, spectral information, patterns, colors, etc.). Hence, the neural network may be an un-trained neural network.

Moreover, the neural network may be part of the image processing device, e.g. stored in a storage or memory of the image processing device, or the image processing device may have access to a neural network, e.g. based on inter-processor communication, electronic bus, network (including internet), etc.

Figure 3:
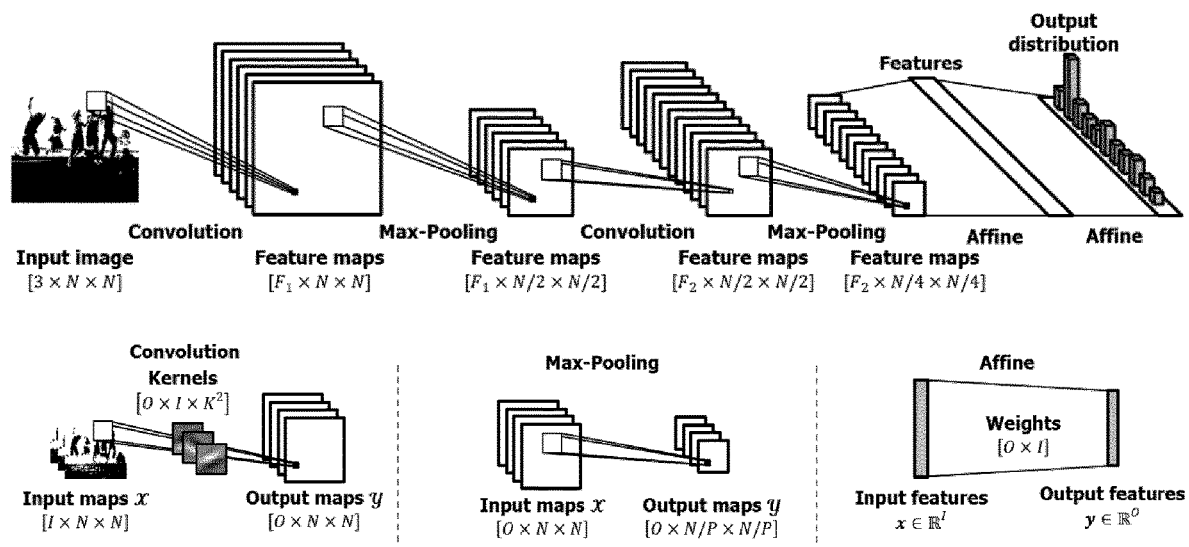
FIG. 3 visualizes the application of a Convolutional Neural Network.

The general principle of the usage of the CNN is exemplary illustrated in FIG. 3, which shows generally in the first line the CNN structure, and in the second line the basic principle of building blocks. The principles of a CNN and its application in imaging is generally known and, thus, it is only briefly discussed in the following under reference of FIG. 3.

The input image includes for example three maps or layers (exemplary red, green and blue (RGB) color information) and N times N blocks. The CNN has a convolutional layer and a subsequent pooling layer, wherein this structure can be repeated as also shown in FIG. 3. The convolutional layer includes the neurons. By applying a kernel (filter) (see convolution kernels in the second line) on the input image, a respective feature map can be obtained. The pooling layer, which is based in the present embodiment on the Max-Pooling (see second line, "Max-Pooling), takes the information of the most active neurons of the convolution layer and discards the other information. After several repetitions (three in FIG. 3), the process ends with a fully-connected layer, which is also referred to as affine layer. The last layer includes typically a number of neurons, which corresponds to the number of object classes (output features) which are to be differentiated by the CNN. The output is illustrated in FIG. 3, first line, as an output distribution, wherein the distribution is shown by a row of columns, wherein each column represents a class and the height of the column represents the weight of the object class. The different classes correspond to the output or image attribute features, which are output by the CNN. The classes are, for example, "people, car, etc." Typically several hundred or several thousand of classes can be used, e.g. also for object recognition of different objects.

In some embodiments, the convolutional neural network may be trained to generate the first multispectral image data from the input image data and the second multispectral image data from the first multispectral image data. As mentioned above, the convolutional neural network (CNN) may generate a plurality of multispectral image data, such as a first multispectral image data and a second multispectral image data, which is generated on the basis of first multispectral image data and which follows the first multispectral image data. That is, each of the plurality of multispectral image data may be generated on the basis of the previous generated multispectral image data and each of the plurality of multispectral image data may be followed by another multispectral image data.

In some embodiments, the convolutional neural network (CNN) may be trained based on RGB image data and on multispectral image data. The training data of multispatial multispectral images may also be generated from high resolution hyperspectral data (the terms multispectral and hyperspectral data are generally known in the art, and they are typically differentiated by the number of spectral channels, wherein the hyperspectral data has more spectral channels than multispectral data). Typically, a CNN, in image processing, uses as training database, groundtruth image data and desired image data, for example RGB image data and multispectral image data.

In particular, multispectral image data, represented by C channels, are generated from hyperspectral image data by using following equation:

$$I_c = \int_{380}^{780} R(\lambda)L(\lambda)S_c(\lambda)d\lambda + n$$

where $I_c$ is the intensity of spectral band c (spectral channel) of a multispectral image, $\lambda$ is the wavelength over which is integrated, R is the spectral reflectance of a target in a scene, L is the spectral distribution of the illumination, e.g. white illumination, which has a flat spectral distribution over all wavelengths, $S_c$ is the sensor's spectral sensitivity of spectral band c and n is the sensor noise.

Here, R is measured hyperspectral data (HS image) by a hyperspectral camera, L can be set considering the illumination which will be used in the application and $S_c$ is given from a sensor specification of a camera.

In some embodiments, the circuitry is further configured to perform object recognition. For example, object recognition may be performed in an autonomous vehicle application, in which a size of a pedestrian in an image may depend on a distance from the vehicle. To detect a pedestrian who is far from the vehicle, a higher spatial resolved image may be suitable for a pedestrian detector. In addition, object recognition may be performed, for example, in a hand identification application, in which a hand may make various poses. In such cases, spatial resolution is less useful than spectral resolution. Hence, the relationship between spectral resolution and spatial resolution may include a higher amount of spectral information than spatial information.

Moreover, image processing based on multispectral and hyperspectral imaging is widely used in food industry (e.g. bruise detection of a fruit, freshness detection of a fish), material classification applications (e.g. remote sensing, medical diagnosis) and the like, and, thus, some embodiments pertain to these fields.

Some embodiments pertain to an image processing method, which may be performed by the image processing device described herein, or any other electronic device, processor, or other computing means or the like. The method includes obtaining input image data being represented by a number of color channels and inputting the input image into a neural network for generating output multispectral image data, wherein the neural network is configured to generate at least first and second multispectral image data on the basis of the input image data, wherein a number of spectral channels of the second multispectral image data is larger than the number of spectral channels of the first multispectral image data.

The image processing method may further include obtaining the first or the second multispectral image data as the output multispectral image data. As mentioned, the input image data may include spectral image data, wherein the number of spectral channels of the output multispectral image data may be larger than the number of spectral channels of the input image data. In addition, a spatial resolution of the first multispectral image data may be higher than a spatial resolution of the second multispectral image data. The output multispectral image data may be generated based on a predetermined relationship between the spatial resolution and the number of spectral channels. Moreover, the neural network may be a convolutional neural network, which may be trained to generate the first multispectral image data from the input image data and the second multispectral image data from the first multispectral image data. Furthermore, the convolutional neural network may also be trained based on RGB image data and on multispectral image data, as discussed herein. The image processing method may further include performing object recognition.

Returning to the description of the embodiments under reference of FIGS. 4 to 8, in the following, an embodiment of an image processing device is discussed under reference of FIG. 4.

In FIG. 4, a block diagram of an embodiment of an image processing device 11 is illustrated, which inputs image data into a convolutional neural network (CNN) for generating multispectral image data, as mentioned herein.

In the present embodiment, the image processing device 11 includes a circuitry 12 with an interface 13, a Central Processing Unit (CPU) 14, including multiple processors including Graphics Processing Units (GPUs), a memory 15 that includes a RAM, a ROM and a storage memory and a trained CNN 16 (which is stored in a memory).

The image processing device 11 acquires, through the interface 13, image data, such as input image data 1, being represented by a number of color channels, namely Red, Green and Blue in this embodiment. The input image data 1 represent an image of a target scene been captured with a digital camera, such as an RGB camera (not shown).

The input image data 1 being represented by a number of color channels are transmitted to the CPU 14, which inputs the input image data 1 into the CNN 16 for generating multispectral image data, being represented by a number of spectral channels. The CNN 16 has been trained in advance to generate (at least) first multispectral image data and second multispectral image data on the basis of the input image data 1. As discussed herein, the image processing device 11 is configured to obtain as output multispectral image data, such as output multispectral image data 2, anyone of the first or the second multispectral image data generated by the CNN 16.

In the present embodiment, the image processing device 11 obtains the second multispectral image data as the output multispectral image data 2. The number of spectral channels of the second multispectral image data is larger than the number of spectral channels of the first multispectral image data, exemplary, the number of spectral channels of the second multispectral image data is nine (9).

The implementation of the above described image processing device 11 may result to computational effort reduction and memory reduction. Furthermore, the CNN 16 may be a single CNN, being able to generate multispatial multispectral image data from a RGB image.

In the following, the usage of the CNN 16, for generating a plurality of multispectral image data on the basis of the input image data 1 is explained under reference of FIG. 5.

Figure 5:
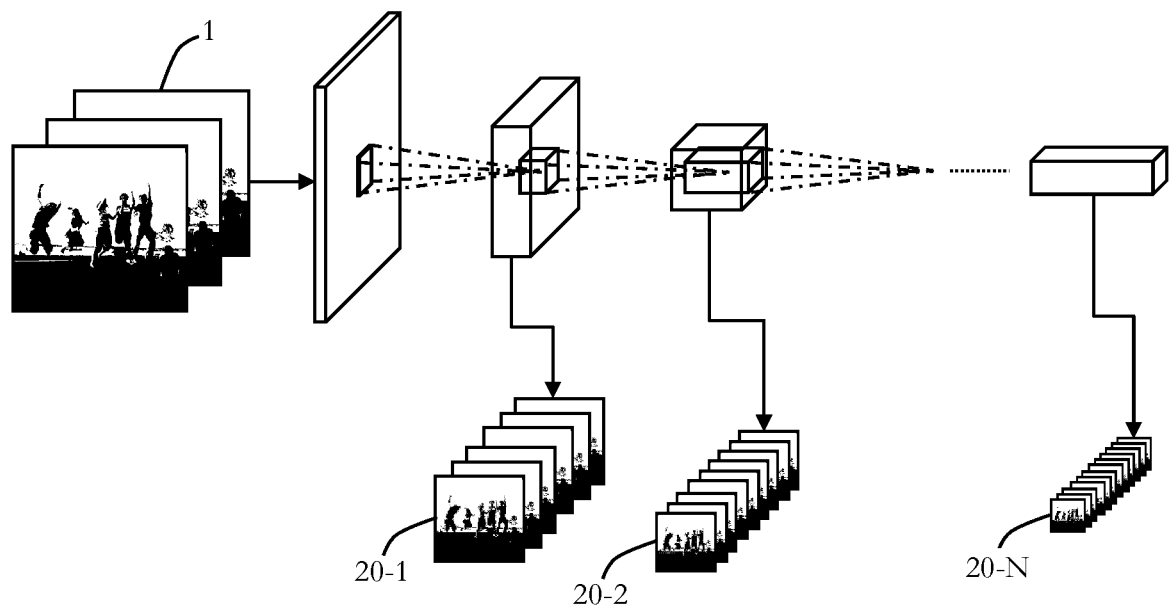
FIG. 5 illustrates an embodiment of a processing scheme of a learning method of a Convolutional Neural Network.

FIG. 5 illustrates an embodiment of a processing scheme of a learning method of the CNN 16 for generating a plurality of multispectral image data 20-1 to 20-N, on the basis of the input image data 1, wherein each multispectral image data of the plurality of multispectral image data may be obtained from the image processing device 11, as the output multispectral image data 2 of FIG. 4.

The image processing device 11 inputs into the CNN 16 the input image data 1, such as RGB image data, which are represented by a number of color channels, namely Red, Green and Blue. As mentioned, an input image in a CNN has a shape, that is, (number of images)×(image width)×(image height)×(image depth). In this embodiment, the input image data 1 representing an input image, of which a height and a width define a spatial resolution. The height of the input image data 1 is $Height_0$ and the width is $Width_0$. The number of spectral channels of the input image data 1 is $Ch_0$. The convolutional layers of the CNN 16 convolve the input image data 1, perform rectification using Rectified Linear Unit (RELU) and spatial pooling that is carried out by max-pooling layers and then, pass their result to the next layer. The result of the next layer is multispectral image data 20-1 (e.g. corresponding to first multispectral image data) being represented, by six (6) spectral channels and the multispectral image data 20-1 represent a multispectral image, which has a height $Height_1$, a width $Width_1$ and a number of spectral channels $Ch_1$, wherein $Height_0 > Height_1$, $Width_0 > Width_1$ and $Ch_0 < Ch_1$. Accordingly, the result of the next layer is multispectral image data 20-2 (e.g. corresponding to second multispectral image data) being represented, by nine (9) spectral channels and the multispectral image data 20-2 represent a multispectral image, which has a height $Height_2$, a width $Width_2$ and a number of spectral channels $Ch_2$, wherein $Height_0 > Height_1 > Height_2$, $Width_0 > Width_1 > Width_2$ and $Ch_0 < Ch_1 < Ch_2$. In this embodiment, the convolution process evolves as described above until a size of the multispectral image data become a size of the kernel of the CNN 16. The result of the last layer of the CNN 16 is multispectral image data 20-N (e.g. corresponding to N-th multispectral data) being represented, by twelve (12) spectral channels and the multispectral image data 20-N represent a multispectral image, which has a height $Height_N$, a width $Width_N$ and a number of spectral channels $Ch_N$, wherein $Height_0 > Height_1 > Height_2 > \ldots > Height_N$, $Width_0 > Width_1 > Width_2 > \ldots > Width_N$ and $Ch_0 < Ch_1 < Ch_2 < \ldots < Ch_N$.

The CNN 16 is trained so that anyone of the multispectral image data 20-1 to 20-N (e.g. first to N-th multispectral data) could be obtained by the image processing device 11, as output multispectral image data 2. That is, the CNN 16 generates multiple intermediate multispectral image data, at several points in the neural network. Moreover, the image processing device 11 obtains anyone of the multispectral image data 20-1 to 20-N with a predetermined relationship between spatial resolution and spectral resolution depending on the application or the target scene. The predetermined relationship may be set in advance by a user and thus, the CNN 16 does not calculate anymore, when the predetermined relationship, which is an optimized relationship between spatial resolution and spectral resolution, is achieved.

The above described embodiment does not limit the present disclosure in that regard. For example, a suitable multispectral image may be determined by analyzing a degree of spatial frequency of an input RGB image. Depending on the performed application, e.g. object classification using CNNs, a multispectral image with a small number of spectral channels may be desirable. On the other hand, spectral information may be more important for the performed application and a multispectral image with a large number of spectral channels may be desirable in some embodiments. Moreover, a target performance may be determined by a result of the application, e.g. reliability of object classification result. For example, the application result may not achieve the target performance when inputting a multispectral image with a small number of spectral channels, and thus, the CNN may continue to generate a multispectral image with a larger number of spectral channels, until the application result achieves the setting criteria.

Figure 6:
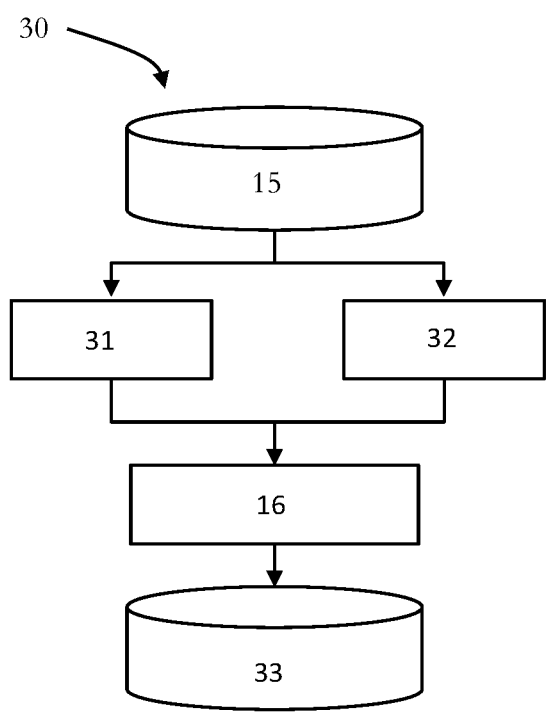
FIG. 6 shows a block diagram of an embodiment of learning system.

An embodiment of a learning system 30, shown as a block diagram, is illustrated in FIG. 6 that generates a learning model based on which a neural network, such as CNN 16 is trained.

The learning system 30 includes a memory device, such as the memory 15 of image processing device 11, described under the reference of FIG. 4, a RGB image generator 31, a multispectral image generator 32, a learning apparatus, such as the CNN 16 and a learning model 33.

High-resolved hyperspectral images represented by hyperspectral (HS) image data are stored into the memory 15 of image processing device 11, having an image resolution of (H)ight*(W)idth*(C)hannels. Then an RGB image is generated from a hyperspectral (HS) image by the RGB image generator 31, having resolution $h_0(\leq H)*w_0(\leq W)*c_0$ (=3) and multiple MS images are generated from a HS image by the multispectral image generator 32, the MS images have a resolution, such as $h_i(<h_0)*w_i(<w_0)*c_i(>c_0)$, where i=1, 2, ..., N and N is the number of intermediate MS images, e.g. represented by a plurality of multispectral image data, such as multispectral image data 20-1 to 20-N of FIG. 5. In this embodiment, the intermediate MS images should meet the following conditions:

$$h_i * w_i * c_i = h_0 * w_0 * c_0 \quad \text{(a)}$$

$$h_i > h_{i+1}, w_i > w_{i+1}, c_i < c_{i+1} \quad \text{(b)}$$

as already described in detail in FIG. 5. The learning apparatus, such as the CNN 16 is trained to transform multiple MS images from a RGB image by minimizing the following reconstruction loss:

$$\text{loss} = MSE(MS_{REC1} - MS_{GT1}) + MSE(MS_{REC2} - MS_{GT2}) + \ldots + MSE(MS_{REC(N)} - MS_{GT(N)})$$

where $MS_{REC(i)}$ is a reconstructed MS image$_i$ by CNN, $MS_{GT(i)}$ is a ground truth of MS image$_i$ which is generated by the multispectral image generator 32, MSE is a Mean Squared Error function, without limiting the present disclosure in that regard. The Mean Absolute Error function, or the like, may also be used. The learning system 30 generates a learned model, which is stored into the memory 15 of image processing device 11.

Figure 7:
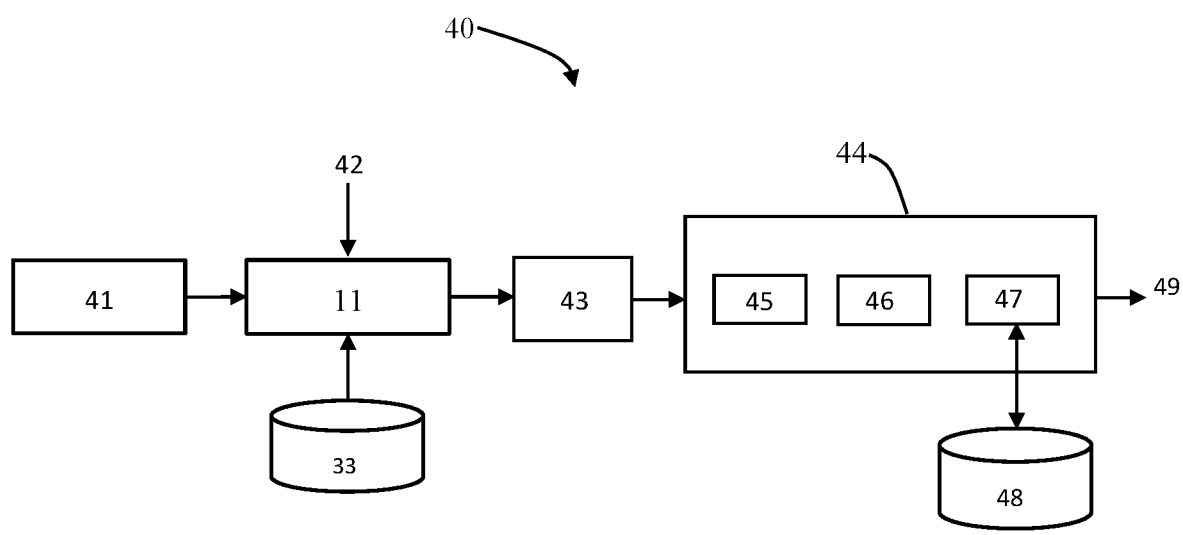
FIG. 7 shows a block diagram of an embodiment of an image processing system.

An embodiment of an image processing system 40 is illustrated in FIG. 7, which shows a block diagram of the image processing system 40.

The image processing system 40 includes an image capturing apparatus 41, such as a camera including a RGB image sensor, the image processing device 11, a memory 48, for storing a database, and an information processing apparatus 44, which includes a target area detection unit 45, a feature extraction unit 46 and a recognition unit 47.

The image processing system 40 is configured to perform object recognition of the image data provided by the image capturing apparatus 41 and processed by the image processing device 11.

In the present embodiment, the image capturing apparatus 41, such as an RGB camera, captures an image, such as a RGB image, of a target scene and transmits RGB image data, representing the captured RGB image, to the image processing device 11. The image processing device 11 outputs multispectral image data 43 being generated by a trained convolutional neural network, such as the CNN 16, which is trained based on the learned model 33. The generated multispectral image data 43 are generated also based on input information 42 that is related to a target to be recognized. The generated multispectral image data 43 are transmitted to the information processing apparatus 44, which is configured to perform object recognition. In the following, regarding the object recognition performed by the information processing apparatus 44, the multispectral image data 43 are transmitted to the target area detection unit 45, the feature extraction unit 46 and then to the recognition unit 47. The recognition unit 47 performs object recognition based on data, included in the database, which is stored in the memory 48. The output 49 of the image processing system 40 depends on recognition result of the target (e.g. user ID).

Figure 8:
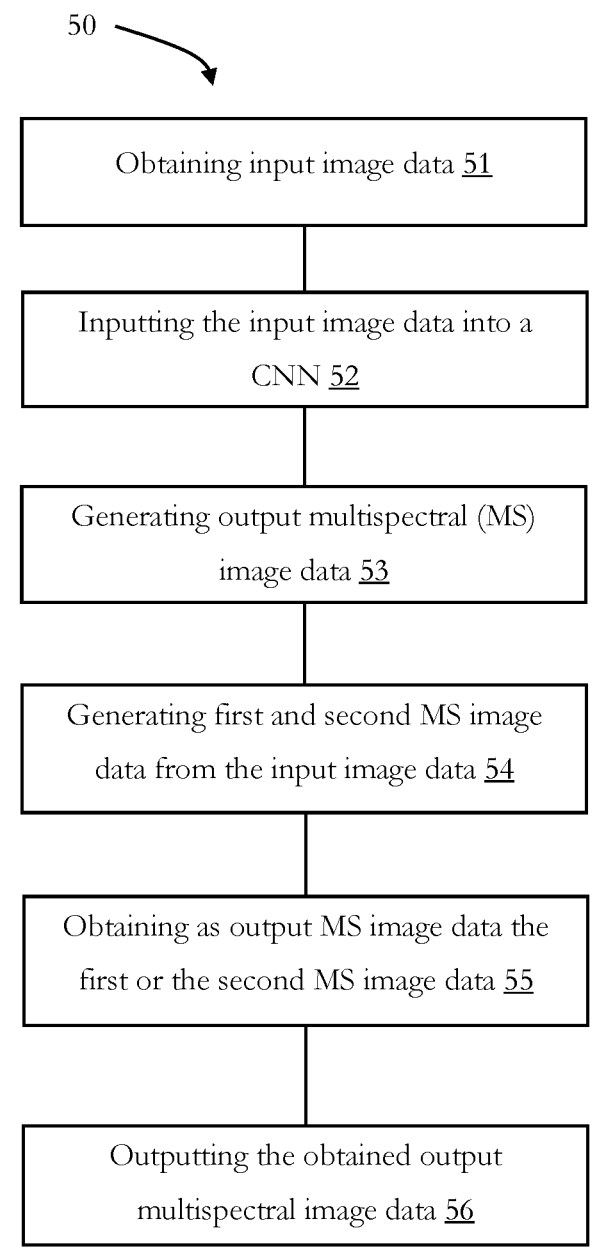
FIG. 8 is a flowchart of an embodiment of an image processing method.

In the following, an image processing method 50, which is performed by the image processing device 11 and/or the image processing system 40 in some embodiments, is discussed under reference of FIG. 8.

At 51, input image data, such as input image data 1, are obtained by the image processing device 11 and/or the image processing system 40, as discussed above.

The input image data may be obtained from an image sensor or from a memory included in the device, from an external memory, etc., or from an artificial image generator, created via computer generated graphics, or the like.

The input image data, at 52 are input into a convolutional neural network, such as CNN 16, for generating, at 53, output multispectral (MS) image data, such as the output multispectral image data 2, as discussed above.

The input image data may be represented by a number of color channels, such as Red, Green and Blue, or may be represented by a small number of spectral channels, for example three (3), or the like.

At 54, the convolutional neural network generates first and second multispectral image data on the basis of the input image data.

A number of spectral channels of the second multispectral image data is larger than the number of spectral channels of the first multispectral image data, as discussed above.

At 55, the first or the second multispectral image data are obtained as output multispectral data.

The first multispectral image data are generated on the basis of the input image data and the second multispectral image data are generated on the basis of the first multispectral image data, as discussed herein.

At 56, the obtained output multispectral image data are output.

It should be recognized that the embodiments describe methods with an exemplary ordering of method steps. The specific ordering of method steps is however given for illustrative purposes only and should not be construed as binding.

The method as described herein is also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An image processing device comprising circuitry configured to:
obtain input image data being represented by a number of color channels;
input the input image data into a neural network for generating output multispectral image data, wherein the neural network is configured to generate at least first and second multispectral image data on the basis of the input image data, wherein a number of spectral channels of the second multispectral image data is larger than the number of spectral channels of the first multispectral image data.

(2) The image processing device of (1), wherein the circuitry is further configured to obtain the first or the second multispectral image data as the output multispectral image data.

(3) The image processing device of (1) or (2), wherein the input image data include spectral image data.

(4) The image processing device of (3), wherein the number of spectral channels of the output multispectral image data is larger than the number of spectral channels of the input image data.

(5) The image processing device of anyone of (1) to (4), wherein a spatial resolution of the first multispectral image data is higher than a spatial resolution of the second multispectral image data.

(6) The image processing device of (5), wherein the output multispectral image data is generated based on a predetermined relationship between the spatial resolution and the number of spectral channels.

(7) The image processing device of anyone of (1) to (6), wherein the neural network is a convolutional neural network.

(8) The image processing device of (7), wherein the convolutional neural network is trained to generate the first multispectral image data from the input image data and the second multispectral image data from the first multispectral image data.

(9) The image processing device of (7), wherein the convolutional neural network is trained based on RGB image data and on multispectral image data.

(10) The image processing device of anyone of (1) to (9), wherein the circuitry is further configured to perform object recognition.

(11) An image processing method comprising:
obtaining input image data being represented by a number of color channels;
inputting the input image data into a neural network for generating output multispectral image data, wherein the neural network is configured to generate at least first and second multispectral image data on the basis of the input image data, wherein a number of spectral channels of the second multispectral image data is larger than the number of spectral channels of the first multispectral image data.

(12) The image processing method of (11), further comprising obtaining the first or the second multispectral image data as the output multispectral image data.

(13) The image processing method of (11) or (12), wherein the input image data include spectral image data.

(14) The image processing method of (13), wherein the number of spectral channels of the output multispectral image data is larger than the number of spectral channels of the input image data.

(15) The image processing method of anyone of (11) to (14), wherein a spatial resolution of the first multispectral image data is higher than a spatial resolution of the second multispectral image data.

(16) The image processing method of (15), wherein the output multispectral image data is generated based on a predetermined relationship between the spatial resolution and the number of spectral channels.

(17) The image processing method of anyone of (11) to (16), wherein the neural network is a convolutional neural network.

(18) The image processing device of (17), wherein the convolutional neural network is trained to generate the first multispectral image data from the input image data and the second multispectral image data from the first multispectral image data.

(19) The image processing method of (17), wherein the convolutional neural network is trained based on RGB image data and on multispectral image data.

(20) The image processing method of anyone of (11) to (19), further comprising performing object recognition

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. An image processing device comprising circuitry configured to:
   obtain input image data being represented by a number of color channels;
   input the input image data into a neural network for generating output multispectral image data, wherein
   the neural network is configured to generate first multispectral image data having a first number of spectral channels and second multispectral image data having a second number of spectral channels greater than the first number, both the first and second multispectral image data generated by the neural network from the input image data.

2. The image processing device of claim 1, wherein the circuitry is further configured to obtain the first or the second multispectral image data as the output multispectral image data.

3. The image processing device of claim 1, wherein the input image data include spectral image data.

4. The image processing device of claim 3, wherein the number of spectral channels of the output multispectral image data is larger than the number of spectral channels of the input image data.

5. The image processing device of claim 1, wherein a spatial resolution of the first multispectral image data is higher than a spatial resolution of the second multispectral image data.

6. The image processing device of claim 5, wherein the output multispectral image data is generated based on a predetermined relationship between the spatial resolution and the number of spectral channels.

7. The image processing device of claim 1, wherein the neural network is a convolutional neural network.

8. The image processing device of claim 7, wherein the convolutional neural network is trained to generate the first multispectral image data from the input image data and the second multispectral image data from the first multispectral image data.

9. The image processing device of claim 7, wherein the convolutional neural network is trained based on RGB image data and on multispectral image data.

10. The image processing device of claim 1, wherein the circuitry is further configured to perform object recognition.

11. An image processing method comprising:
    obtaining input image data being represented by a number of color channels;
    inputting the input image data into a neural network for generating output multispectral image data, wherein
    the neural network is configured to generate first multispectral image data having a first number of spectral channels and second multispectral image data having a second number of spectral channels greater than the first number, both the first and second multispectral image data generated by the neural network from the input image data.

12. The image processing method of claim 11, further comprising obtaining the first or the second multispectral image data as the output multispectral image data.

13. The image processing method of claim 11, wherein the input image data include spectral image data.

14. The image processing method of claim 13, wherein the number of spectral channels of the output multispectral image data is larger than the number of spectral channels of the input image data.

15. The image processing method of claim 11, wherein a spatial resolution of the first multispectral image data is higher than a spatial resolution of the second multispectral image data.

16. The image processing method of claim 15, wherein the output multispectral image data is generated based on a predetermined relationship between the spatial resolution and the number of spectral channels.

17. The image processing method of claim 11, wherein the neural network is a convolutional neural network.

18. The image processing device of claim 17, wherein the convolutional neural network is trained to generate the first multispectral image data from the input image data and the second multispectral image data from the first multispectral image data.

19. The image processing method of claim 17, wherein the convolutional neural network is trained based on RGB image data and on multispectral image data.

20. The image processing method of claim 11, further comprising performing object recognition.

* * * * *